E. COOPER & C. E. CLARK.
SECTIONAL BRACE.
APPLICATION FILED DEC. 2, 1911.

1,026,659.

Patented May 21, 1912.

Witnesses:
James N Keane
L. L. Markel.

Inventors:
Edwin Cooper
Chas. E. Clark
By their Attorneys
Sutherland Anderson

COLUMBIA PLANOGRAPH CO., WASHINGTON, D. C.

UNITED STATES PATENT OFFICE.

EDWIN COOPER, OF EAST HARTFORD, AND CHARLES E. CLARK, OF HARTFORD, CONNECTICUT.

SECTIONAL BRACE.

1,026,659.  Specification of Letters Patent.  Patented May 21, 1912.

Application filed December 2, 1911. Serial No. 663,613.

*To all whom it may concern:*

Be it known that we, EDWIN COOPER and CHARLES E. CLARK, citizens of the United States, residing at East Hartford and Hartford, respectively, in the county of Hartford and State of Connecticut, have invented certain new and useful Improvements in Sectional Braces, of which the following is a specification.

This invention relates to sectional braces such as are utilized for holding augers, drills and other tools, the object of the invention being to provide an effective article of this character, the parts of which can be readily and quickly separated when it is desired to stow away the implement, the latter being provided with means for rigidly and securely maintaining the parts in operative relation when it is desired to employ the device in work.

Figure 1:
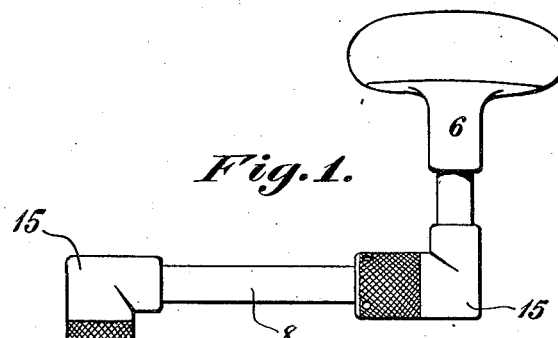
Figure 3:
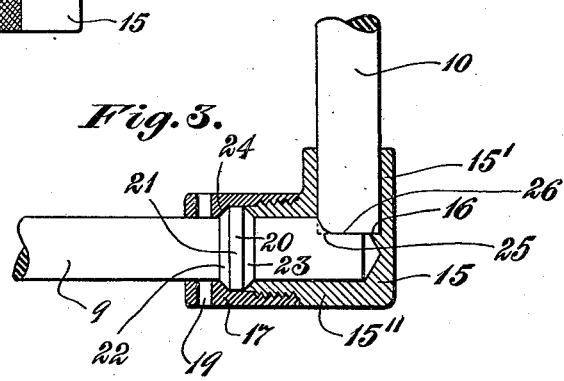
Figure 2:
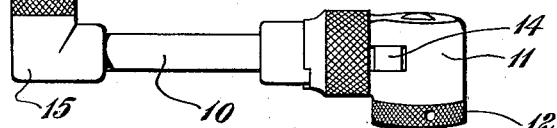
Figure 2:
Figure 4:
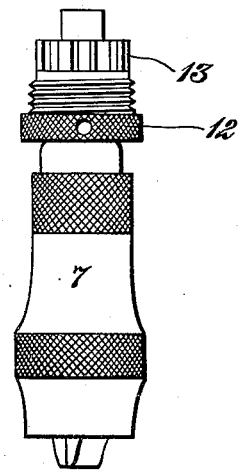
Figure 4:
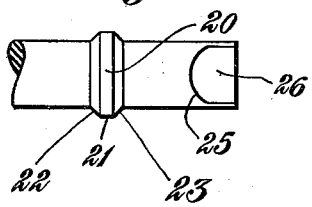

In the drawings accompanying and forming part of the present specification Figure 1 is a side elevation of a sectional brace involving our invention. Fig. 2 is a like view of a chuck or tool carrying member. Fig. 3 is a sectional view partly in elevation of a tubular coupling and the terminal portions of two members connected therewith. Fig. 4 is a detail view of a portion of the yoke.

Like characters refer to like parts throughout the several figures.

In the drawings we have shown one simple and convenient form of embodiment of the invention which will be hereinafter described in detail, this showing being to enable those skilled in the art to practise the invention. We do not restrict ourselves however, to such disclosure; we may depart therefrom in several respects within the scope of the invention covered in our claims.

Referring now particularly to Fig. 1, the brace therein illustrated involves a yoke or crank member as 5, a handle member as 6 and a chuck or tool carrying member as 7. The yoke or crank portion 5 as illustrated, comprises three parts 8, 9 and 10 which as will hereinafter appear, are detachably jointed to each other and which may as represented, consist of rods of any suitable form in cross section; for instance circular, although this particular shape is not a matter of consequence. The part 10 is shown provided at its outer end with a socket 11 adapted to receive the head or upper portion of the chuck or tool carrying member 7, the latter being furnished with a swiveled or rotary coupling member 12 adapted to screw into the socket 11 to thereby connect the chuck or tool carrying member 7 with said part 10. The said chuck or tool carrying member 7 is equipped with a ratchet 13 for engagement by a pawl as 14 carried by the member 10. This construction is well-known in braces of various kinds for which reason it is not necessary for us to describe the same in detail, our invention residing in joints whereby the sections or parts of the yoke or crank 5 are detachably connected to each other and whereby the upper branch of said yoke can be likewise connected with the shank of the handle member 6. As all of said joints are the same in construction a detailed description of one will apply to the others, and in this particular connection reference is had to Figs. 3 and 4 wherein parts of the rod 9 and 10 are shown. The joint between said parts 9 and 10 involves in its make-up a tubular elbow or coupling member 15, and although either of the parts 9 and 10 may be rigidly connected with said tubular elbow 15, the part 10 is shown as driven in the branch 15' thereof and as resting on a bearing or shoulder 16 therein. Said rod also extends a short distance into the branch 15'' for a reason that will hereinafter appear. It will be observed that the parts of the rods 9 and 10 which are disposed in said tubular elbow 15 are peripherally plain so that it, therefore, becomes a simple matter to insert the butt of the rod in said tubular coupling and to also slide the rod 9 longitudinally in said coupling. Surrounding the outer end of the member 9 is a sleeve 17 which is internally threaded to engage threads on the branch 15'' of the tubular elbow 15, said sleeve 17 having a milled surface to facilitate its being turned and also having several perforations or holes 19 to receive a spanner, wrench or the like, by which the said sleeve can be firmly set up. The part 9 is shown equipped with a projection such as the collar 20 which may be made integral therewith, although this is not essential and which has a cylindrical portion 21 and two oppositely tapered portions 22 and 23, the tapered portion 22 coöperating with the tapered portion 24 within the coupling sleeve 17. The sleeve 17 surrounds this collar 20 and the inner surface of the sleeve is contiguous to the cylindrical portion 21 of said collar 20. As will be remembered the rod or member 10 is rigidly connected with the elbow 15, and these two parts in effect constitute a unit, while the sleeve 17 is swivelly or rotatively connected with the member 9.

It will be assumed that the parts 9 and 10 are separated and that it is desired to unite them. In this event the forward or outer end of the member 9 is introduced into the branch 15'' of the tubular elbow 15 and the sleeve 17 is then engaged with the threaded portion of said branch 18 and then turned thereonto and as the turning operation progresses the tapered portion 23 is brought against the rim of the branch 18 while the tapered surface 24 of said sleeve will firmly fit against the tapered portion 22 thereby securely holding the parts together. It is conceivable that one of these tapered surfaces might be omitted, although we prefer to employ them both, in that additional security is provided. As a matter of fact to secure the maximum strength we do not in all cases rely on the said double wedge relation as will now appear.

The members 9 and 10 are preferably so associated that the member 9 cannot possibly rotate in the tubular coupling member or elbow 18, and although this function can be obtained in several ways we can obtain excellent results by providing the member 9 with a bearing face to engage the adjacent end of the relatively rigid member 10. Said member 9 is shown as laterally cut away as at 25 thus producing a flat bearing surface 26 to be engaged by the flattened end of the relatively fixed member 10 whereby when these two flat surfaces are in engagement it is not possible for the member 9 to turn. It will be evident, of course, that when the part 9 is inserted into the tubular elbow 15, the flat bearing surface 26 will engage against the corresponding bearing surface of the part 10 and as the coupling sleeve 17 is turned home the surface 26 will be drawn along the coöperating surface of the part 10, so that when the parts are assembled as indicated, they are held in most substantial relation. To separate the parts 9 and 10 it is simply necessary to unscrew the coupling sleeve 17 and when this is accomplished, the part 9 can be withdrawn from the elbow or coupling member 15. There are, as will be clear, three of such elbows 15, one being at the junction of the member 8 and the handle 6, while the other two are at the corners of the yoke 5. By manipulating the joints the three yoke parts can be separated from each other and the handle 6 can be separated from the yoke, while by unscrewing the sleeve 12, the chuck member 7 can be separated from the yoke or crank member 5 so that when the brace is knocked down or its parts separated, there will be four of said parts which occupy a very small compass and the brace in such knock-down condition can be easily stowed away in the average tool box of the mechanic.

What we claim is:

1. A sectional brace comprising two members, and an angular coupling device into the branches of which said members are fitted, said members having a bearing engagement against each other to prevent the rotation of one of said members with respect to the other.

2. A sectional brace comprising two members, and an angular coupling device into one branch of which one of said members is driven, the other member being slidable longitudinally in the other branch of said coupling member, said members having a bearing engagement inside the coupling device to prevent rotation of said longitudinally slidable member.

3. A sectional brace comprising a tubular elbow, a member driven into one branch of the elbow, and a second member slidingly fitted in the other branch of the elbow, said second member having a portion of its circumference cut away to form a flat bearing face and the butt of the first mentioned member engaging said bearing face to prevent rotation of said slidable member.

4. A sectional brace comprising a tubular elbow, a member driven into one branch of the elbow, and a second member slidingly fitted in the other branch of the elbow said second member having a portion of its circumference cut away to form a flat bearing face and the butt of the first mentioned member engaging said bearing face to prevent rotation of said slidable member, said elbow having a bearing therein against which the first member abuts.

In testimony whereof we affix our signatures in presence of two witnesses.

EDWIN COOPER.
CHAS. E. CLARK.

Witnesses:
  HEATH SUTHERLAND,
  F. E. ANDERSON.

---

Copies of this patent may be obtained for five cents each, by addressing the "Commissioner of Patents, Washington, D. C."